Nov. 17, 1925.

A. CAMPBELL 1,562,203

CAR DOOR OPERATING MECHANISM

Filed April 28, 1924    2 Sheets-Sheet 1

INVENTOR.
ARGYLE CAMPBELL
BY George I Haight
HIS ATTORNEY.

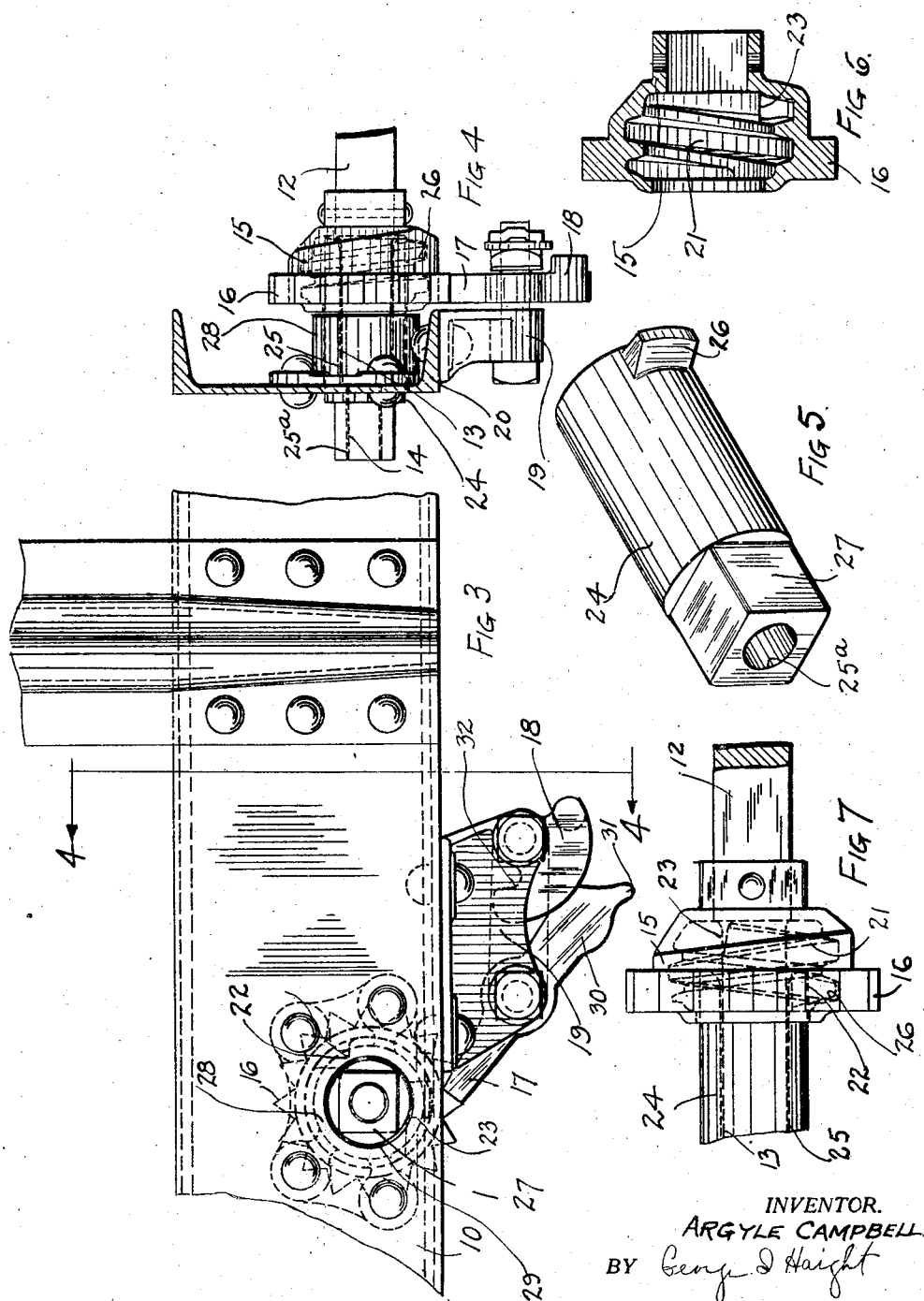

Patented Nov. 17, 1925.

1,562,203

UNITED STATES PATENT OFFICE.

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS.

CAR-DOOR-OPERATING MECHANISM.

Application filed April 28, 1924. Serial No. 709,331.

*To all whom it may concern:*

Be it known that I, ARGYLE CAMPBELL, a citizen of the United States, residing at Chicago, in the county of Cook and State of Illinois, have invented a certain new and useful Improvement in Car-Door-Operating Mechanisms, of which the following is a full, clear, concise, and exact description, reference being had to the accompanying drawings, forming a part of this specification.

This invention relates to improvements in car door operating mechanisms.

It is an object of my invention to provide simple and convenient means of operating dump car doors which may be applied where the clearance and available space exterior of the side walls of the car for the disposition of such operating means is restricted. This improved mechanism is especially adapted to cars having shafts extending transversely of the car and through a wall member depending below the floor of the car. In such types of cars, it is usual to provide the greatest width possible between side walls, to attain great carrying load capacity and it has been found that the use of shaft operating mechanisms of the type usually employed project beyond the clearance limits of the cars and are liable to damage from sidewiping by adjacent cars, or by encountering obstructions along the right of way. I overcome such disadvantages by the use of the novel operating means herein disclosed.

It is a further object of my invention to provide a mechanism of the character indicated having certain parts disposed behind a side wall member wherein all the parts which are manipulated by the operator are visible and readily accessible without the necessity of the operator crouching beneath the car to get at the parts.

Further, my invention resides in certain novelties of construction and arrangement of parts such as will be more particularly pointed out in this specification and claims.

Figure 1:
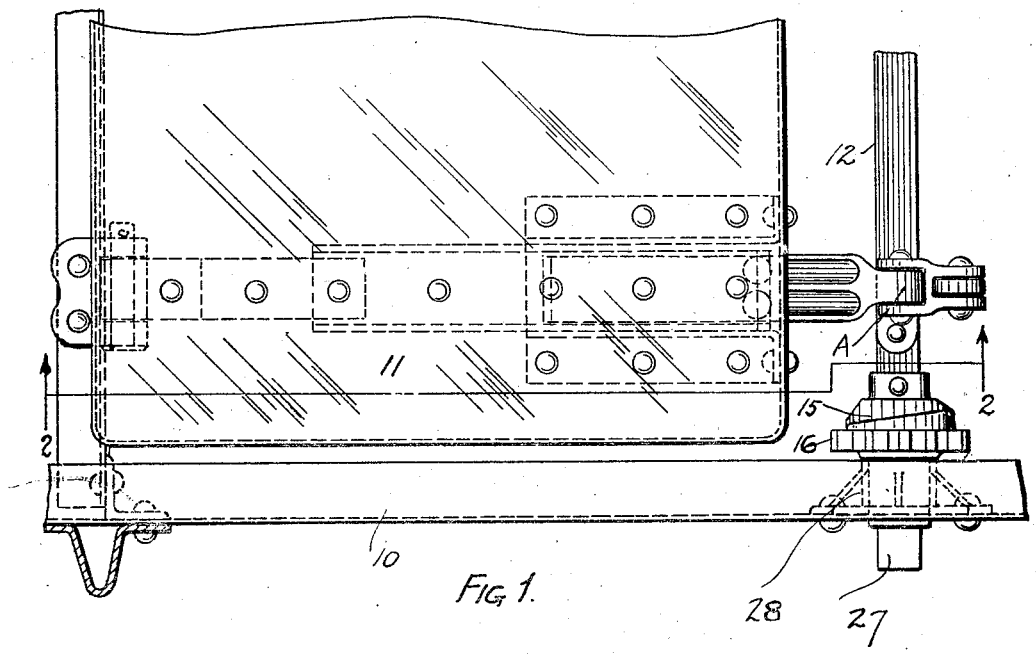
Figure 2:
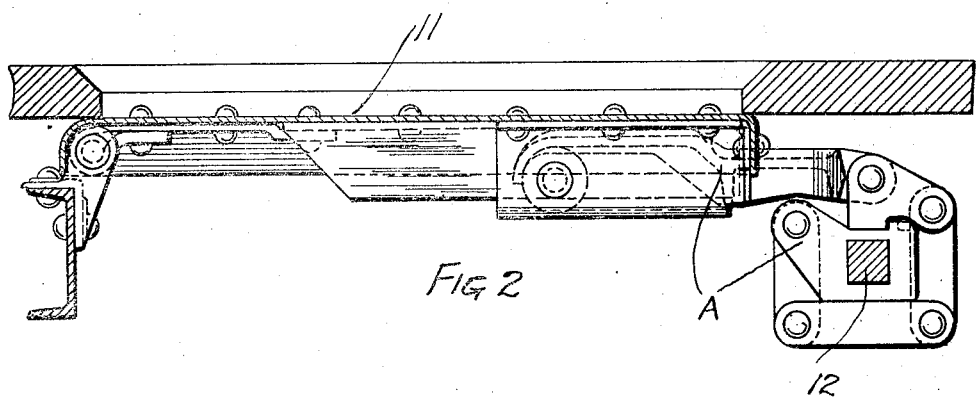

In the drawing forming a part of this specification, Figure 1 is a plan view of a portion of a dump car, showing my improvements in connection therewith, the portion shown representing that adjacent the side of the car, with the flooring omitted in order to better illustrate the essential parts. Figure 2 is a vertical, longitudinal, sectional view of the car structure, corresponding substantially to line 2—2 of Figure 1. Figure 3 is a side elevational view of a portion of the car showing in detail, on an enlarged scale, the operating mechanism. Figure 4 is a vertical sectional view corresponding substantially to line 4—4 of Figure 3. Figure 5 is a detailed, perspective view of the movable clutch member associated with the operating mechanism. Figure 6 is a vertical, sectional view of a hollow ratchet member rigidly united with the operating shaft. Figure 7 is a plan view of the movable clutch member and ratchet member in assembly relation in place on the winding shaft, the bearing and side member of the car being omitted for the sake of clearness.

In said drawings, the lower portion of the side wall member of a car is designated at 10. The car is of that type having pivoted drop bottom doors, the end of one being indicated at 11.

For operating the doors, the car is provided with a transversely extending shaft 12 which is disposed adjacent the free edge of the door and beyond the curve path of movement of the free edge of the door. In actual practice, said shaft 12 will pass through the center sills of the car (not here shown), and will there be mounted in suitable bearings. The shaft and door are connected by means of a suitable winding and locking mechanism, designated generally by the reference character A. The specific winding and locking mechanism employed is preferably of the type described and claimed in my co-pending serial application No. 691,830, and I make no claim herein to this subject matter. It will be understood, of course, that any mechanism for lifting and closing the doors may be used, and it is immaterial what sort of winding connections are used. The shaft 12 is extended to the side of the car and through the side member 10 and is provided at its outer end with cylindrical portions 13 and 14 respectively, the latter being at the extreme outer end of the shaft, and being somewhat smaller in diameter than the portion 13. Fixedly mounted on the shaft 12 for rotation therewith is a hollow clutch member 15, having preferably formed integrally therewith a series of teeth 16 of the usual construction, and with which co-operates a pivoted pawl 17, adapted to be locked by the usual form of locking cam 18 as shown in Figure 3. Said pawl 17 and cam 18 are carried by a bracket 19 preferably carried by the lower marginal flange 20 of the side member 10. The interior of the hollow clutch member 15 is provided with a helical groove 21, which may have one or more complete convolutions, always slightly in excess of and depending upon the number of rotations necessary to wind and unwind the operation shaft, said groove being provided with front and rear limiting stops as indicated at 22 and 23 respectively. The second member of the clutch device 24 comprises a cylindrical shaped member having interior cylindrical portions 25 and 25$^a$ adapted to fit on the cylindrical portions 13 and 14 respectively of the shaft 12, said member 24 being provided also with an integrally formed lug or projection 26 which moves in the helical groove 21 and which limits the amount of rotation of the member 24 relatively to the member 15 by engaging the limiting stops 22 and 23 at the ends of the groove. The outer end of the clutch member 24 is formed with a squared head 27, which is disposed outwardly of the car wall 10 and adapted to receive the jaws of a claw bar or other suitable device for effecting rotation of the shaft. Intermediate the square portion 27 and the lug 26, the member 24 is formed of cylindrical shape and is adapted to be mounted in a journal bearing member 28 secured to side member 10 of the car. Said bearing member 28 is preferably disposed on the inner face of the side member 10 of the car and is also adapted to reinforce the same for the weakness caused therein by the hole 29. It will be observed by reference to Figures 3 and 4 that the locking pawl 17 is disposed somewhat away from the outer face of the side member 10 of the car and inwardly thereof, and that the ratchet teeth 16 of the member 15 are largely obscured from view of the operator but inasmuch as the lower portion of the pawl 17 is provided with a weighted portion 30, the locking portion 17 will automatically drop into locking position with respect to the ratchet 16, said weighted portion 30 also forming a convenient handle which the operator may grasp to manipulate the pawl. The extreme end of the weighted portion 30 of the pawl 17 is formed with a tail piece 31 adapted to engage with a recessed portion 32 formed in cam 18 for the purpose of maintaining the pawl 17 in disengaged position with respect to the ratchet teeth 16.

The operation of the mechanism is as follows: Assuming the parts in position shown in Figures 3 and 4, to open or drop the door 12, the operator first disengages the locking pawl 17 from its co-operating ratchet wheel 16 and engaging the squared end 27 of the clutch member 24 rotates the same in a counter-clockwise direction, the lug 26 then moving in the helical groove 21 from a position in engagement with the rear lug 23 to a position in engagement with the front lug 22, the position of the parts 24 and 15 being then as shown in Figure 7. With the parts thus in engagement, continued rotation of the member 24 in the indicated direction will unlock the winding and locking mechanism A and start the unwinding operation of the shaft, whereupon the weight of the door and lading will immediately exert a rotating pull or torque on the operating shaft 12. This rotating movement, however, will not be communicated to the member 24, due to the clutch member 15 turning on the member 24, there being one and one-quarter revolutions of lost motion between the respective members 24 and 15, in the mechanism illustrated, this amount of lost motion being sufficient to permit the door to open fully without imparting rotation to the member 24 thereby insuring safety to the operator. It will, of course, be understood that the degree of lost motion between the respective parts may be varied to suit different types of winding mechanisms. When the door is fully opened, the lug 26 is again positioned closely adjacent the stop lug 23, ready for the next door closing operation. Upon rotation of the member 24 in a clockwise direction, the lug 26 will be immediately brought into engagement with the lug 23, imparting clockwise rotation to the shaft 12 and effecting the winding of the mechanism A. When the door has been fully closed, the gravity actuated pawl 17, by engagement with the teeth 16 of the member 15, will positively prevent unwinding of the mechanism A and hold the door locked in closed position.

My invention is susceptible to various changes and modifications and although I have shown herein and described what I now consider a simple and efficient manner of carrying out the invention, the same is merely illustrative, and I contemplate all changes and modifications that come within the scope of the claims appended hereto.

I claim:

1. In a railway car, the combination with the side wall thereof; of a shaft extending across the plane of the side wall; a ratchet wheel on the shaft disposed inwardly of the side wall; a pawl coacting with the ratchet; and means carried by the end of the shaft and disposed outside of the side wall of the car for the purpose of imparting rotation to shaft, said shaft rotating means being adapted to have movement in one direction independent of the movement of the shaft.

2. In a dump car having a side wall extending below the floor level of the car and an operating shaft extending across the plane of said side wall, the combination with means for rotating said shaft; of means for locking the shaft against reverse rotation, said means including a ratchet wheel mounted on the shaft behind said side wall, and a pivoted locking pawl cooperable with said ratchet wheel, said locking pawl having a portion thereof extended down below said side wall to render the same accessible for manipulation.

3. In a dump car having a side wall extending below the floor level of the car and a transversely extending door operating shaft carried thereby, the combination with shaft rotating means disposed outwardly of the car side wall; of means for locking the shaft against reverse rotation, said means including: a ratchet wheel mounted on the shaft inwardly of said car side wall, a bracket carried by the side wall, a locking pawl pivotally mounted on said bracket and adapted to cooperate with the ratchet wheel, said pawl having a downwardly extending portion projecting beyond the side wall and a locking cam pivotally mounted on said bracket cooperable with the pawl.

4. In a railway car, the combination with a floor door; of a car side wall extending below the said door, said wall having the lower edge thereof reinforced with a marginal flange; an operating shaft extending across the plane of the said wall; a connection from the shaft to the door; a member rigidly secured to the shaft and disposed inwardly of the car wall; a pawl mounted on the bracket, and cooperable with the member on the shaft to prevent rotation thereof in one direction; and shaft rotating means disposed outwardly of the car.

5. In a railway car, the combination with a car wall; of a door operating shaft extending transversely thereof, a ratchet wheel non-rotatably mounted on the shaft, said ratchet wheel having the main portion thereof disposed behind the car wall and normally obscured from view; a pivoted locking pawl cooperable with said ratchet wheel, said pawl having a portion thereof extended below said wall and thereby readily accessible for manipulation.

6. In a car door operating mechanism, the combination with a fixed bearing; of an operating shaft; and a clutch device connected with the said shaft, said device comprising a member fixedly mounted on the shaft and another member rotatably and slidably mounted in the fixed bearing and supporting said shaft, one of said members having a spiral groove and the other a lug working in said groove, whereby the two members are rotatable independently of each other.

7. In a railway car having a pivoted door, the combination with a car wall, of a door operating shaft extending across the plane of the wall; a hollow clutch member non-rotatably mounted on the shaft and disposed entirely inwardly of the car wall, said member being provided with a spiral groove and limiting stops; and a second member rotatably mounted on the shaft and having an operating tool receiving portion outwardly of the car side wall, said last named member having a lug adapted to move in the spiral groove and coact respectively with said limiting stops.

8. In a car door operating mechanism, the combination with a fixed bearing; of a door winding shaft; a hollow member non-rotatably mounted on the shaft, said member being provided with a spiral groove and limiting stops, the number of convolutions of said spiral groove exceeding the number of rotations required of the shaft in closing the car door and a second member loosely mounted on the shaft and carried in the said fixed bearing, said second member being provided with means engaging in the spiral groove and cooperating with said limiting stops.

9. In a railway car having a floor door; the combination with a side wall extending below the said door, said wall having the lower marginal edge thereof provided with an outstanding flange; of an operating shaft for the door, said shaft extending through a perforation in the side wall of the car; a bracket bearing for the shaft, said bracket being disposed on the inner side of the wall adjacent the perforation and reinforcing the opening; a connection from the shaft to the door; a hollow member fixedly mounted on the shaft and disposed on the inner side of the wall, said member having a plurality of exterior ratchet teeth and an interior spiral groove provided with limiting stops at the opposite ends thereof; a sleeve member mounted in the bearing, said member having one end shaped to receive an actuating tool and having at the other end a lug adapted to coact with said spiral groove and stops; the end having the square portion being disposed outwardly of the car wall; a bracket carried by the lower marginal flange of the side wall, a pawl pivotally mounted on the bracket and having a portion extended upwardly and cooperable with the toothed member secured to the shaft and provided with a weighted portion extending below said wall, and a safety cam pivoted on the bracket and cooperable with said weighted portion of the pawl.

10. In a dump car provided with a side wall member, the combination with a pivoted door; of an operating shaft for said door; ratchet means for said shaft; a member projecting outwardly beyond said side wall member adapted to be engaged by a tool for producing rotation of said shaft; and a lost motion connection between said shaft and last-named member, said ratchet means and lost motion connection being disposed inwardly of said side wall member.

11. In a dump car provided with a side wall element, the combination with a pivoted door; of an operating shaft for said door; means disposed outwardly of said wall adapted to be engaged by an operating tool; and a lost motion device between said means and shaft for permitting relative rotation thereof to the extent of more than one revolution, said device being disposed entirely inwardly of said side wall element.

12. In a dump car provided with a side wall member, the combination with a pivoted door; of operating means for said door, including a rotary shaft, a ratchet means thereon and a pawl coacting with said ratchet means, said ratchet means and pawl being disposed on the inner side of said wall member, and said pawl having one end weighted and protruding beneath the side wall member.

13. In a load discharging vehicle, the combination with a load discharging door disposed inwardly of a wall of said vehicle; of mechanism for opening and closing said door, including a shaft also disposed inwardly of said car wall member; means for retaining said mechanism in locked condition said means being disposed behind the wall of the vehicle; a member having a portion thereof extended outwardly beyond said car wall member and adapted to be manually actuated for effecting operation of said mechanism; and a lost motion device operatively interposed between said member and shaft, said lost motion device and said means being also disposed inwardly of said car wall member.

In witness that I claim the foregoing I have hereunto subscribed my name this 25th day of April, 1924,

ARGYLE CAMPBELL.